Patented June 16, 1936

2,044,083

UNITED STATES PATENT OFFICE 2,044,083

AMINOHYDROQUINONE - DI - (BETA - HYDROXYETHYL) ETHER AND METHOD OF PRODUCING SAME

Arthur Howard Knight, Ashton-on-Mersey, and Wilfred Archibald Sexton, Manchester, England, assignors to Imperial Chemical Industries Limited, a corporation of Great Britain No Drawing. Application July 3, 1934, Serial No. 733,682. In Great Britain July 6, 1933

8 Claims. (Cl. 260—130.5)

According to the present invention we manufacture aminohydroquinone di-(β-hydroxyethyl) ether, which is a new dyestuff intermediate, by interacting hydroquinone with ethylene chlorhydrin to give hydroquinone di-(β-hydroxyethyl) ether, acylating this, preferably with acetic anhydride, nitrating the acylated compound and then reducing and deacylating. Deacylation may precede reduction if desired. Further deacylation and reduction may be effected simultaneously.

Also according to the invention we manufacture the same new dyestuff intermediate by a modification of the above in which the acylation is omitted.

The new dyestuff intermediate is of value in the manufacture of dyestuff, for instance, as described in co-pending application No. 735,539, filed July 16, 1934.

The following examples in which parts are by weight illustrate but do not limit the invention.

*Example 1.*—56 parts of caustic soda are dissolved in 400 parts of hot ethyl alcohol and to this solution is added a solution of 77 parts of hydroquinone in 100 parts of alcohol. 124 parts of dry ethylenechlorhydrin are added and the whole is heated for 10 hours in an autoclave at 130° C. Approximately half the alcohol is removed by evaporation. The hot liquor is filtered from suspended salt and the filtrate cooled. Hydroquinone di-(β-hydroxyethyl) ether crystallizes out and is separated by filtration and dried. It has M. P. 92–93° C. and on recrystallization from alcohol, 96–97° C. The yield is good.

88 parts of the above condensation product are boiled gently under reflux for 2 hours with 132 parts of acetic anhydride to which has been added a trace of sulphuric acid. The reaction mixture is poured into water and the solid product separated by filtration. The yield of hydroquinone di-(β-acetoxyethyl) ether is practically quantitative and the crude product melts at 96–98° C.

113 parts of the above diacetyl compound are dissolved in 340 parts of acetic acid and the solution cooled to 20° C. A mixture of 28 parts of 94% nitric acid and 50 parts of acetic acid is gradually added, the temperature being kept below 20° C. by cooling. The solution is stirred for 2 hours after all the acid has been added then poured into 600 parts of ice water and stirred. The solid product is separated by filtration, washed with water and dried. The yield is good and the crude nitrohydroquinone di-(β-acetoxyethyl) ether melts at 68–70° C. Recrystallization from alcohol raises the M. P. to 71–72° C.

The above nitro compound is reduced by iron in the known manner, using with 105 parts of nitro compound 800 parts of water, 160 parts of iron and 10 parts of 36% hydrochloric acid. After reduction the hot reduction mixture is filtered from iron oxide sludge, the liquor concentrated, and then allowed to cool. Aminohydroquinone di-(β-acetoxyethyl) ether crystallizes out. After recrystallization from alcohol it melts at 117–118° C.

The aminohydroquinone di-(β-acetoxyethyl) ether obtained as above is boiled for 1–2 hours with dilute (ca. 5%) sodium hydroxide, and after neutralization of the excess alkali with hydrochloric acid, the liquor is allowed to cool.

Aminohydroquinone di-(β-hydroxyethyl) ether crystallizes out and has M. P. 132–134° C. Recrystallization from alcohol causes no change in M. P. Its purity as determined by titration against nitrous acid is 97%.

*Example 2.*—This is the same as Example 1 except that the nitro compound is not reduced and hydrolyzed in two processes but in one as follows:—

17 parts of the nitro compound are stirred with 100 parts of boiling water. A solution of 24 parts of sodium sulphide crystals and 3.2 parts of sulphur in 50 parts of water is added during 10 minutes and the whole boiled gently under reflux for 2 hours. The mixture is then cooled and treated with acetic acid until no longer alkaline to brilliant yellow; after concentration it is filtered from sulphur and allowed to cool.

Aminohydroquinone di-(β-hydroxyethyl) ether crystallizes out. The yield is good and the crude product melts at 131–133° C.

*Example 3.*—275 parts of hydroquinone and 205 parts of sodium hydroxide are dissolved in 1000 parts of water and heated to 45° C. 25 parts of precipitated chalk are added, followed by a solution of 403 parts of ethylene chlorhydrin in 806 parts of water, the mixture is heated to boiling and boiled gently under reflux with stirring for 5 hours. The mixture is filtered hot to remove chalk, 180 parts of sodium chloride are added to the hot filtrate, and this is allowed to cool while stirring to 25° C. The hydroquinone di-(β-hydroxyethyl) ether which comes out is filtered and well drained.

146 parts of 86.3% of nitric acid and 214 parts of water are mixed and 198 parts of hydroquinone di-(β-hydroxyethyl) ether as an aqueous paste containing 44 parts of water are added in half an hour at 30–35° C. The mixture is stirred for 3 hours at 30–35° C. and is then diluted with 500 parts of water and made alkaline to brilliant yellow paper by approximately 130 parts of 32% aqueous sodium hydroxide. A further 120 parts of 32% aqueous sodium hydroxide are added, followed by 40 parts of sulphur and 300 parts of sodium sulphide crystals, and the mixture is stirred at a gentle boil for 5 hours. The mixture is allowed to cool to 25° C. while still stirring. The aminohydroquinone di-(β-hydroxyethyl) ether which precipitates is filtered, washed with 200 parts of cold water, and dried.

We claim:

1. The process for the manufacture of the new dyestuff intermediate, aminohydroquinone di-(β-hydroxyethyl) ether, which comprises interacting ethylene chlorhydrin with hydroquinone to give hydroquinone di-(β-hydroxyethyl) ether, acylating this, nitrating the acylated product and then reducing and deacylating.

2. The process for the manufacture of the new dyestuff intermediate, aminohydroquinone di-(β-hydroxyethyl) ether, which comprises interacting ethylene chlorhydrin with hydroquinone to give hydroquinone di-(β-hydroxyethyl) ether, nitrating, and then reducing.

3. Aminohydroquinone di-(β-hydroxyethyl) ether.

4. The method which comprises reacting hydroquinone with ethylene chlorhydrin in a basic alcohol solution at a temperature of about 130° C. for about ten hours in confinement, and separating out hydroquinone-di-(beta-hydroxyethyl) ether, boiling it under reflux for about two hours with acidified acetic anhydride and separating out hydroquinone-di-(beta-acetoxyethyl) ether, nitrating the said acetoxyethyl ether by reacting with concentrated nitric acid at about 20° C. and separating out the nitro-hydroquinone-di-(beta-acetoxyethyl) ether, reducing the said nitro compound by reaction in water solution with iron and hydrochloric acid and separating out the aminohydroquinone-di-(beta-acetoxyethyl) ether, boiling said amino compound with dilute caustic, acidifying, and separating out the aminohydroquinone-di-(beta-hydyroxyethyl) ether.

5. The method which comprises reacting hydroquinone with ethylene chlorhydrin in alcohol solution in confinement at about 130° C., and separating out hydroquinone-di-(beta-hydroxyethyl) ether, boiling it under reflux with acidified acetic anhydride and separating out hydroquinone-di-(beta-acetoxyethyl) ether, nitrating the said acetoxyethyl ether by reacting with nitric acid and separating out the nitro-hydroquinone-di-(beta-acetoxyethyl) ether, reducing, and deacylating the said acetoxyethyl ether and separating out the aminohydroquinone-di-(beta-hydroxyethyl) ether.

6. The method of making aminohydroquinone-di-(beta-hydroxyethyl) ether which comprises reacting hydroquinone with ethylene chlorhydrin, reacting the product with acetic anhydride, nitrating, reducing and deacylating the so-formed acetoxyethyl ether.

7. In the manufacture of aminohydroquinone-di-(beta-hydroxyethyl) ether the steps which comprise reacting hydroquinone-di-(beta-hydroxyethyl) ether with acetic anhydride, nitrating, reducing, and deacylating the so-formed acetoxyethyl ether.

8. In the manufacture of aminohydroquinone-di-(beta-hydroxyethyl) ether the steps which comprise nitrating, reducing and deacylating hydroquinone-di-(beta-acetoxyethyl) ether.

ARTHUR HOWARD KNIGHT.
WILFRED ARCHIBALD SEXTON.